L. ANNIS.
Potato Digger.
No. 85,418.
Patented Dec. 29, 1868.
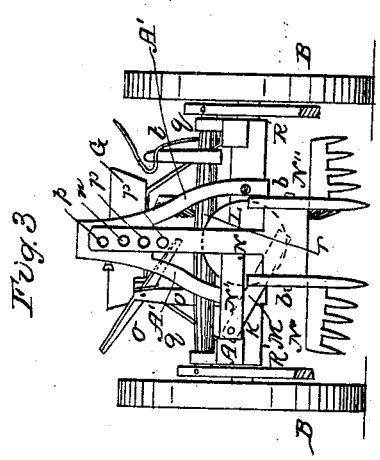
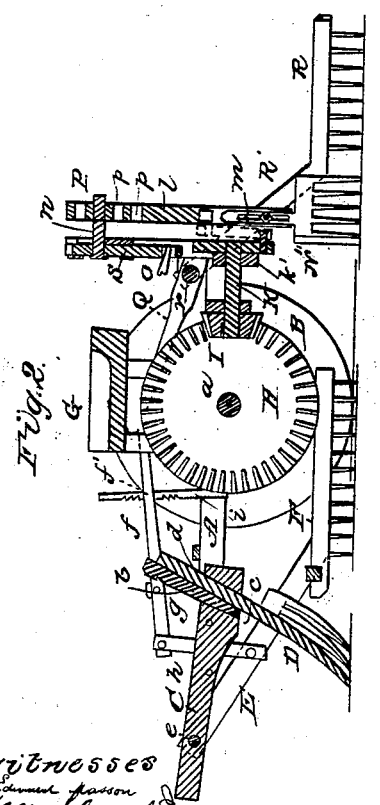
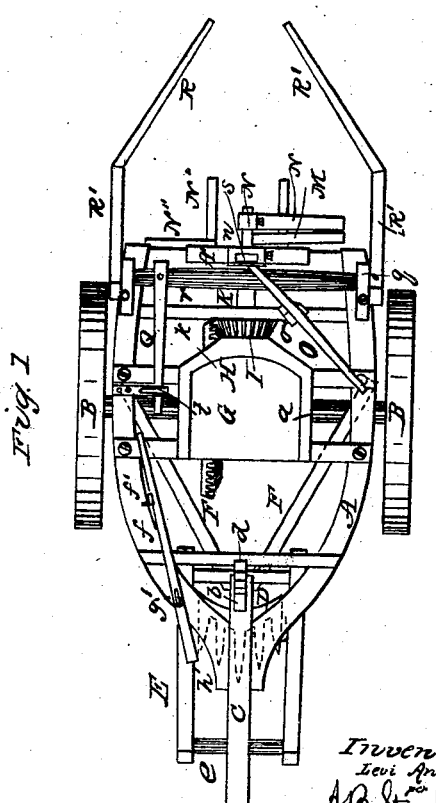
Witnesses
Inventor
Levi Annis
A.B. Stoughton
Atty.

LEVI ANNIS, OF QUINCY, MICHIGAN.

Letters Patent No. 85,418, dated December 29, 1868

IMPROVEMENT IN POTATO-DIGGERS.

The Schedule referred to in these Letters Patent and making part of the same.

*To all whom it may concern:*

Be it known that I, LEVI ANNIS, of Quincy, in the county of Branch, and State of Michigan, have invented certain new and useful Improvements in Potato-Diggers and Cultivators, and that the following is a full, clear, and exact description of the same, reference being had to the accompanying drawings, making a part of this specification, in which—

Figure 1 represents a top view of the potato-digger and cultivator.

Figure 2 represents a vertical section through the same.

Figure 3 represents a rear view of the same.

Similar letters of reference, where they occur in the drawings, denote like parts in all the figures.

My invention relates to an apparatus for digging potatoes, so constructed that the whole surface of the ground is well stirred up at the same time that the potatoes in the rows are brought to the surface, and constitutes, in this manner, a potato-digger and a cultivator, which leaves the ground in a fine pulverized state, clear of weeds, and ready for the reception of seeds.

To enable others skilled in the art to make and use my invention, I will proceed to describe the same with reference to the drawings.

A represents the frame, which is mounted on the axle $a$, the latter being supported by the wheels B. This frame A is curved on its fore part like hounds, so as to embrace the tongue C, to which the team is attached. A hole, $c$, is cut through the after part of the tongue C, into which is introduced, at a certain angle, the shank, $d$, of the forked digger D, the latter being kept in proper position by the wedge $b$.

To the tongue C is hung and pivoted, by means of the shaft $e$, the quadrangular frame E, which carries with it the V-shaped harrow F.

This frame and harrow can be raised or lowered by the driver, from his seat G, by means of the lever $f$, which is pivoted to the standard $g$, and is attached, at one end, to the frame E by the connecting-bar $h$, while the other end of the lever $f$ is kept in the desired position by its pin, $f'$, resting in one of the notches of the double rack $i$, the lower rack being intended to keep the harrow F off the ground, when it is not needed in light sandy soil, and the upper rack is to keep the lever $f$ raised, and consequently the harrow F down in the ground to the required depth.

On the axle $a$, and attached to it, is placed, under the driver's seat, the bevel-cog wheel H, which gears with the bevel-pinion I, the latter being mounted on the shaft K, which is carried in bearings on two transverse pieces, $k$ $k'$, attached to the frame A.

This shaft K carries on its after end the crank-wheel L, which operates the connecting-rod M, attached to the arm N' of the vibrating-digger N, giving the latter a rocking motion well calculated to stir the ground and bring to the surface any potatoes that might remain below the surface.

This digger N is constructed with two sets of adjustable rakes, N". Each rake has one set of teeth set lengthwise of the machine and one set crosswise, or at right angles with the first, the teeth of the latter being gradually shorter, so as to accommodate themselves to the rocking motion of the digger N.

The height of the rakes N" is adjusted by means of the screws $l$ passing through the slots $m$ cut in the shanks of the rakes N".

To get its rocking motion, the upper portion of the digger N is kept stationary by the pin $n$, around which it oscillates.

This pin $n$ can be introduced in any of the holes, $p$, of the digger N, according to the depth required from the latter to operate to the best advantage. It can also be lifted clear of the ground by the lever O, pivoted to the standard $o$, and engaging with the sliding bearing S, which carries the fulcrum-pin $n$.

This sliding bearing S is kept in a vertical position by the frame A', which is attached to the cross-piece $k'$ of the frame A of the machine.

Following the digger N, and attached to the machine by two arms, R', are two rakes, R, inclined toward each other, for the purpose of gathering in a ridge on the soil the potatoes which have been unearthed by the machine. The arms, R', of these rakes are attached to the cross-shaft $r$, placed in suitable bearings, $q$, attached to the frame A. To this cross-shaft $r$ is also attached the hand-lever Q, by which means the gathering-rakes R can be lifted off the ground for transportation by engaging the lever Q under the catch $t$, or they might be folded over the machine when taking the machine to or from the field.

The operation is as follows:

The machine being taken to the field, the digger D is inserted in the ground to the required depth, and wedged down to the tongue C. The after-digger or spreader N is also set to the required depth by means of the pin $n$ and holes $p$, or by the screws $l$ passing through the slots $m$, when, on starting the team, the harrow F pulverizes the ground raised by the digger D, which is stirred up and worked again by the rocking digger N, the operation being completed by the gathering-rakes R, which leave the potatoes to dry on the surface of the ground, in a convenient condition for gathering and carting off the field.

Having thus fully described my invention,

What I claim therein as new, and desire to secure by Letters Patent, is—

In combination with the forked digger, fixed in a rigid portion of the tongue or frame, the swinging controllable frame E. for carrying, behind the digger, the harrows F, substantially as and for the purpose described.

Also, the vibrating digger N, for shaking up the potatoes and pulverizing the soil, when made controllable by the operator in his seat, and vibrated laterally of the path of the machine, by means substantially as described.

Also, in combination with the laterally-vibrating digger for shaking up the potatoes and working the soil, the adjustable arms R', with their inwardly-inclined rakes, for gathering the potatoes into a row, substantially as described.

LEVI ANNIS.

Witnesses:
  ISAAC D. TOLL,
  CALVIN MARBLE.